US007996344B1

(12) United States Patent
Goel

(10) Patent No.: US 7,996,344 B1
(45) Date of Patent: Aug. 9, 2011

(54) MULTI-OBJECTIVE EVOLUTIONARY ALGORITHM BASED ENGINEERING DESIGN OPTIMIZATION

(75) Inventor: Tushar Goel, Livermore, CA (US)

(73) Assignee: Livermore Software Technology Corporation, Livermore, CA (US)

( * ) Notice: Subject to any disclaimer, the term of this patent is extended or adjusted under 35 U.S.C. 154(b) by 0 days.

(21) Appl. No.: 12/719,764

(22) Filed: Mar. 8, 2010

(51) Int. Cl.
*G06N 3/12* (2006.01)
(52) U.S. Cl. ....................................................... 706/13
(58) Field of Classification Search ................ 706/13
See application file for complete search history.

(56) References Cited

U.S. PATENT DOCUMENTS
2008/0010044 A1   1/2008   Ruetsch

FOREIGN PATENT DOCUMENTS
GB   WO02075650   9/2002

OTHER PUBLICATIONS

Deb et al ("Evaluating the ε-Domination Based Multi-Objective Evolutionary Algorithm for a Quick Computation of Pareto-Optimal Solutions" 2005).*
Trautmann et al ("A Convergence Criterion for Multiobjective Evolutionary Algorithms Based on Systematic Statistical Testing" 2008).*
Goel et al ("Response surface approximation of Pareto optimal front in multi-objective optimization" 2006).*
Abraham et al ("Evolutionary Multiobjective Optimization Approach for Evolving Ensemble of Intelligent Paradigms for Stock Market Modeling" MICAI 2005).*
Zheng et al ("An Efficient Method for Maintaining Diversity in Evolutionary Multi-objective optimization" IEEE 2008).*
Laumanns et al ("Combining Convergence and Diversity in EvolutionaryMulti-Objective Optimization" 2002).*
European Patent Office: "The extended European search report for application No. 10195666.2-2224", May 11, 2011.
Schnier et al.: "Digital filter design using multiple pareto fronts", Evolable Hardware, 2001. Proceedings. The Third NASA/DOD Workshop on Jul. 12-14, 2001, Piscataway, NJ, USA, IEEE, Jul. 12, 2001, pp. 136-145, XP010554328, ISBN: 978-0-7695-1180-1.
Adel Jedidi et al. "Optimization of Cells Overlap and Geometry with Evolutionary Algorithms", Mar. 9, 2004, Applications of Evolutionary Computing; [Lecture Notes in Computer Science;; LNCD], Springer-Verlag, Berlin/Heidelberg, pp. 130-139, XP019003871 ISBN: 978-3-540-21378-9.

* cited by examiner

*Primary Examiner* — Jeffrey A Gaffin
*Assistant Examiner* — Lut Wong
(74) *Attorney, Agent, or Firm* — Roger H. Chu

(57) ABSTRACT

Systems and methods of obtaining a set of better converged and diversified Pareto optimal solutions in an engineering design optimization of a product (e.g., automobile, cellular phone, etc.) are disclosed. According to one aspect, a plurality of MOEA based engineering optimizations of a product is conducted independently. Each of the independently conducted optimizations differs from others with parameters such as initial generation and/or evolutionary algorithm. For example, populations (design alternatives) of initial generation can be created randomly from different seed of a random or pseudo-random number generator. In another, each optimization employs a particular revolutionary algorithm including, but not limited to, Nondominated Sorting Genetic Algorithm (NSGA-II), strength Pareto evolutionary algorithm (SPEA), etc. Furthermore, each independently conducted optimization's Pareto optimal solutions are combined to create a set of better converged and diversified solutions. Combinations can be performed at one or more predefined checkpoints during evolution process of the optimization.

9 Claims, 9 Drawing Sheets

MULTI-OBJECTIVE EVOLUTIONARY ALGORITHM BASED ENGINEERING DESIGN OPTIMIZATION

CROSS REFERENCE TO RELATED APPLICATIONS

This application is related to a co-pending U.S. patent application Ser. No. 12/702,939 for "METHODS AND SYSTEMS FOR MULTI-OBJECTIVE EVOLUTIONARY ALGORITHM BASED ENGINEERING DESIGN OPTIMIZATION", filed on Feb. 9, 2010, the entire content of which is incorporated herein by reference.

FIELD OF THE INVENTION

The present invention generally relates to engineering design optimization, more particularly to an improved method of obtaining a set of better converged and diversified global Pareto optimal solutions in multi-objective evolutionary algorithm (MOEA) based engineering design optimization.

BACKGROUND OF THE INVENTION

Today, computer aided engineering (CAE) has been used for supporting engineers in tasks such as analysis, simulation, design, manufacture, etc. In a conventional engineering design procedure, CAE analysis (e.g., finite element analysis (FEA), finite difference analysis, meshless analysis, computational fluid dynamics (CFD) analysis, modal analysis for reducing noise-vibration-harshness (NVH), etc.) has been employed to evaluate responses (e.g., stresses, displacements, etc.). Using automobile design as an example, a particular version or design of a car is analyzed using FEA to obtain the responses due to certain loading conditions. Engineers will then try to improve the car design by modifying certain parameters or design variables (e.g., thickness of the steel shell, locations of the frames, etc.) based on specific objectives and constraints. Another FEA is conducted to reflect these changes until a "best" design has been achieved. However, this approach generally depends on knowledge of the engineers or based on a trial-or-error method.

Furthermore, as often in any engineering problems or projects, these objectives and constraints are generally in conflict and interact with one another and design variables in nonlinear manners. Thus, it is not very clear how to modify them to achieve the "best" design or trade-off. This situation becomes even more complex in a multi-discipline optimization that requires several different CAE analyses (e.g., FEA, CFD and NVH) to meet a set of conflicting objectives. To solve this problem, a systematic approach to identify the "best" design, referred to as design optimization, is used.

The optimization of such systems with more than one objective functions is referred to as multi-objective optimization. Contrary to the single-objective optimization problems (SOPs), the multi-objective optimization problems (MOPs) do not yield a single optimum solution. Instead, it results in a set of optimal solutions that represent different trade-offs among objectives. These solutions are referred to as Pareto optimal solutions or Pareto optimal solution set. Design objective function space representation of the Pareto optimal solution set is known as Pareto optimal front (POF). One of the most common strategies to find Pareto optimal solutions is to convert the multi-objective optimization problem to a single objective optimization problem and then find a single trade-off solution. There are multiple ways of converting a MOP to a SOP, namely, weighted sum strategy, inverted utility functions, goal programming, $\epsilon$-constraint strategy, etc. Drawbacks from this prior art approach of converting MOP to SOP are that each optimization simulation results in a single trade-off, and multiple simulations may not end in sufficiently diverse trade-off solutions.

Recently, one of the engineering design optimization methodologies is based on genetic algorithm (GA) or evolutionary algorithm. Genetic algorithms have been demonstrated to efficiently solve multi-objective optimization problems because they result in a diverse set of trade-off solutions in a single numerical simulation. GA generally starts with randomly created populations as the initial generation. Then evolutionary schemes such as crossovers and/or mutations are used for creating future generations. One of the problems in MOEA is that Pareto optimal solutions obtained may not be diversified (i.e., spread and uniformity may be poor), or convergence maybe inadequate.

In order to improve the quality, particularly the diversity, of POF in a MOEA based engineering optimization, it would, therefore, be desirable to have improved methods and systems for achieving a set of diversified global Pareto optimal solutions in a MOEA based engineering design optimization.

SUMMARY OF THE INVENTION

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

Systems and methods of obtaining a set of better converged and diversified Pareto optimal solutions in an engineering design optimization of a product (e.g., automobile, cellular phone, etc.) are disclosed. According to one aspect of the present invention, a plurality of MOEA based engineering optimizations of a product is conducted independently. Each of the independently conducted optimizations differs from others with certain parameters such as initial generation and/or evolutionary algorithm. For example, populations (design alternatives) of initial generation can be created randomly from different seed of a random or pseudo-random number generator. In another, each optimization employs a particular evolutionary algorithm including, but not limited to, Non-dominated Sorting Genetic Algorithm (NSGA-II), strength Pareto evolutionary algorithm (SPEA), etc.

According to another aspect of the present invention, each independently conducted optimization's Pareto optimal solutions are combined to create a set of better converged and diversified solutions. Combinations can be performed at one or more predefined checkpoints during evolutionary process of the optimization.

According to yet another aspect, the MOEA based engineering optimization is performed in a computer system. For example, evaluations of design objective functions are conducted with computer aided engineering analysis (e.g., finite element analysis, meshfree analysis, etc.). Randomly created populations are based on a random or pseudo-random number generator implemented in a computer system.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-7. However, those skilled in the art will readily appreciate that the detailed description given herein with respect to these figures is for explanatory purposes as the invention extends beyond these limited embodiments.

Figure 1A:
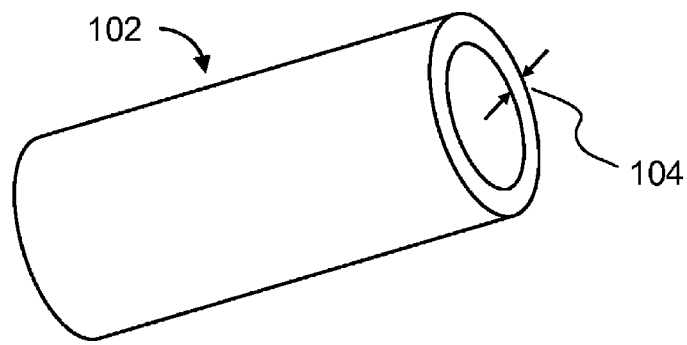
FIG. 1A is a diagram showing a tubular member (an exemplary engineering product) to be optimized using thickness as design variable.

Referring first of FIG. 1A, a tubular structural member 102 (i.e., an exemplary engineering product) is optimized in an engineering optimization with design objective of minimizing the weight therefore minimizing the cost for a given material (e.g., regular strength steel) under certain design loading condition. It is evident that thinner thickness 104 would lead to a less weight structure. However, at certain point, the structural would become too weak to stand a design load (e.g., structural failure due to material yielding and/or buckling). Hence, the engineering optimization of this tubular structure requires another design objective of maximizing the strength, which leads to a safer structure. In this exemplary case, thickness 104 is a design variable, which may have a range (e.g., from one eighth of inch to half an inch) as a design space. Any design alternatives are selected from this space. In multi-objective evolutionary algorithm, population or design alternatives at each generation are selected from the design space.

The design space is one-dimensional (e.g., a line) when there is only one design variable. The design space becomes a two-dimensional area for two variables, and so on. For more than three design variables, the design space is a hyperspace that is not possible to illustrate.

Figure 1B:
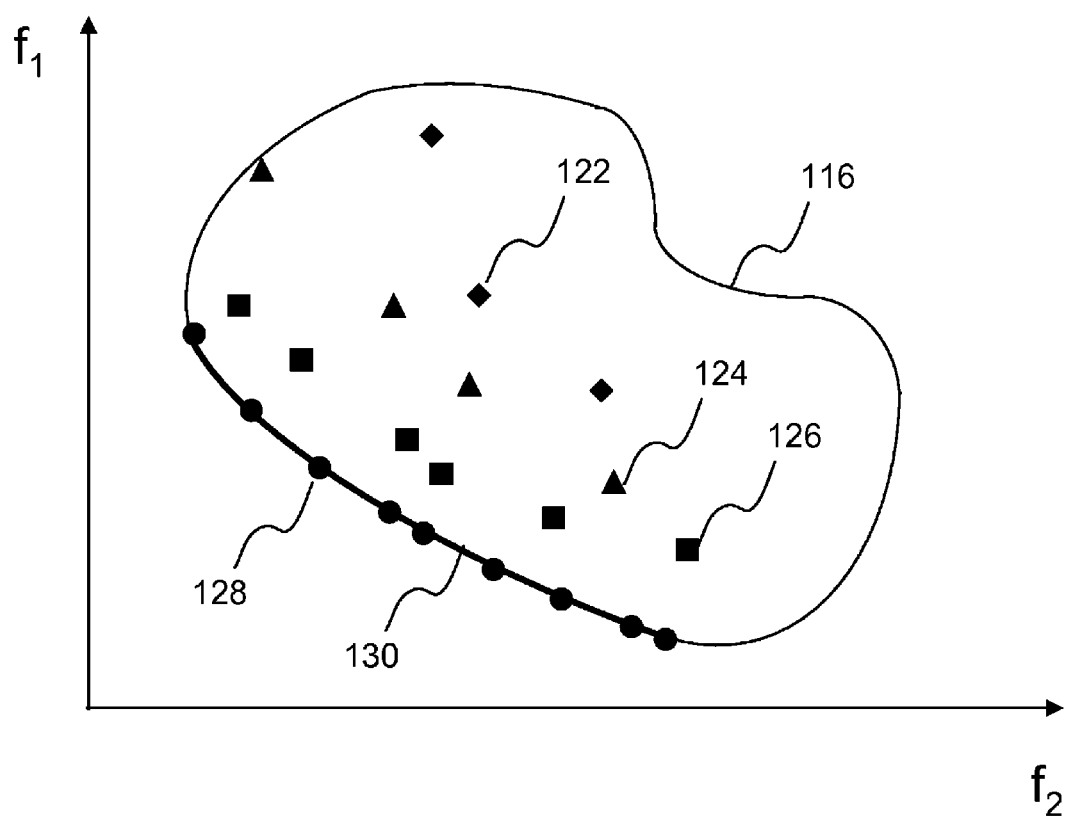
FIG. 1B is a diagram showing exemplary solutions including Pareto optimal solutions in a multi-objective function space.

Based on two conflicting design objectives, FIG. 1B is an X-Y diagram showing a results of an exemplary design optimization. Two axes represent two different objectives in form of functions $f_1$ and $f_2$. In a multi-objective optimization, there is no one optimized solution instead there is a set of solutions that reflects tradeoffs among objectives. In order to differentiate each solution, a concept called non-domination criterion is used for comparing solutions.

Figure 1C:
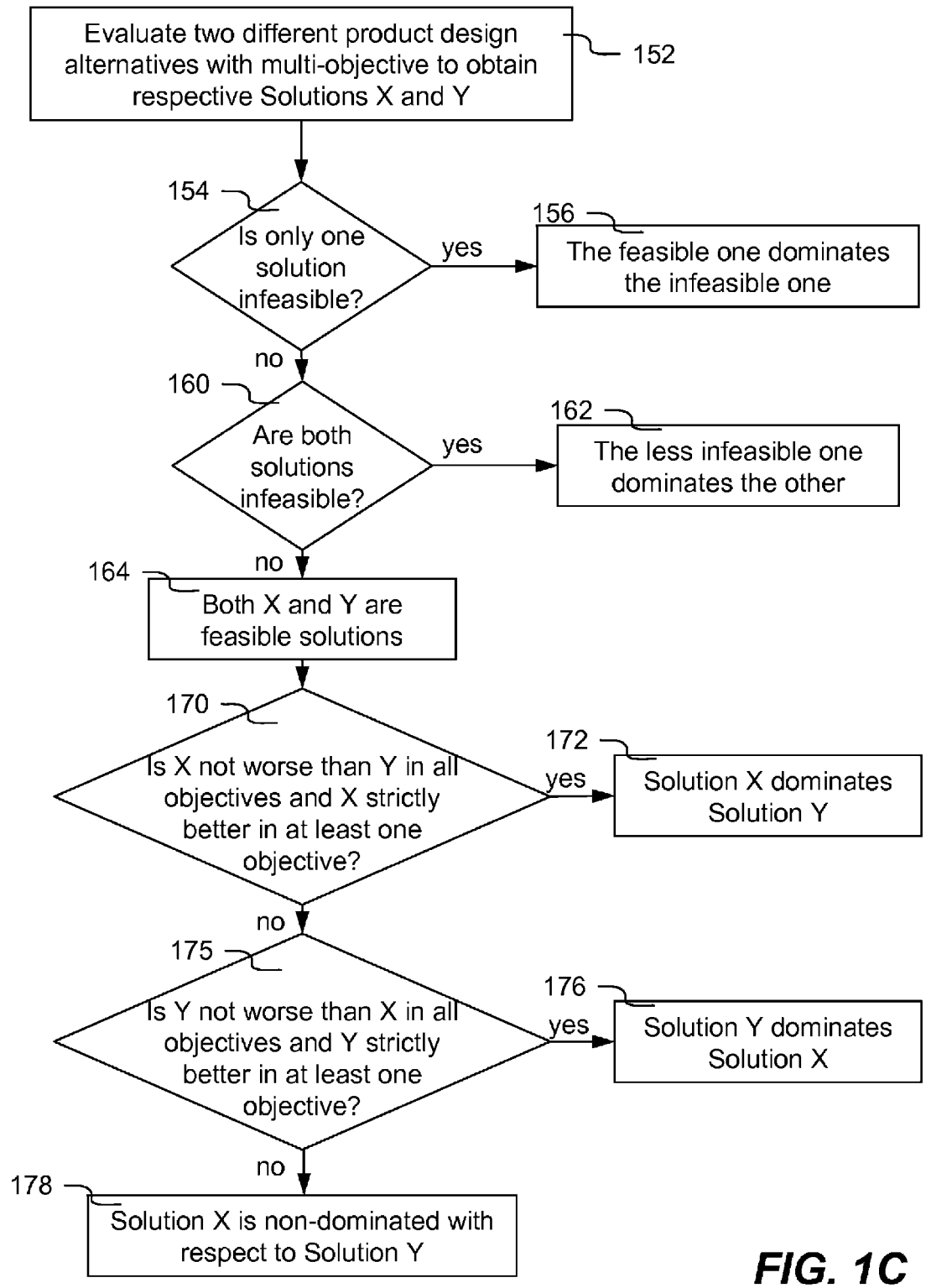
FIG. 1C is a flowchart illustrating an exemplary process of determining non-dominated solution criterion used in implementing one embodiment of the present invention.

FIG. 1C is a flowchart illustrating an exemplary process of determining the non-domination criterion. Two design alternatives are evaluated to obtain respective solutions X and Y according to the design objective functions (i.e., multi-objective) in step 152. Solution X dominates Y (step 172), if any of the following three conditions is true.

1. X is feasible and Y is infeasible. (Steps 154 and 156)
2. Both X and Y are infeasible (step 160), but X is less infeasible compared to Y (step 162).
3. When both X and Y are feasible (step 164), the following two conditions must be satisfied (steps 170 and 172):
   a. X is not worse than Y in all design objectives; and
   b. X is strictly better than Y in at least one design objective.

Furthermore, one can determine if the solution Y dominates X (steps 175 and 176). Finally, if neither solution dominates the other, X and Y are non-dominated to each other (step 178).

FIG. 1B shows a two-objective unconstrained minimization example. Each dot represents an evaluated solution of a design alternative (e.g., one of the populations in a given generation of the MOEA) within area 116. In accordance with the non-domination criterion, for each diamond 122, there is at least one triangle 124 that is better than the diamond 122 in at least one objective without being inferior in other objective. So all individual solutions in diamond 122 are dominated by the triangles 124. Similarly, all triangles 124 are dominated by squares 126 and squares are dominated by circles 128. No solution represented by triangles 124 can be said better than any other solution represented by triangles 124, thus they are non-dominated with respect to each other. All individuals represented by circles 128 are non-dominated with respect to any other individual hence having a best or highest rank (e.g., rank of one). If all points represented by circles are removed from FIG. 1B, then the individuals represented by squares 126 become non-dominated with respect to all others. Therefore, squares 128 are assigned next best rank (e.g., rank of two), and so on.

In the example shown in FIG. 1B, circles 128 represent a set of Pareto optimal solution and the line 130 connecting all circles 128 is called the Pareto optimal front. It is noted that there would generally be more than one individual or solution having the same rank.

One aspect of Pareto optimal solutions is referred to as diversity, which is quantified with two measurements: spread and uniformity. Spread is defined as the largest diagonal length of the largest hypercube formed by the set of Pareto optimal solutions in the N-dimensional function space. Spread can also be defined as volume of the largest hypercube. Uniformity is defined as how uniformly the solutions are distributed in a set of Pareto optimal solutions. Mathematically, uniformity $\Delta$ can be expressed as follows:

$$\Delta = \sum_{i=1}^{n} \frac{|d_i - \bar{d}|}{n}$$

$$\bar{d} = \frac{1}{n}\sum_{i=1}^{n} d_i$$

where $d_i$ is defined as crowding distance of a solution in function space (see graphical example shown in FIG. 2), "n" is the total number of solutions in the set of Pareto optimal solutions. Crowding distance is defined as half of the perimeter of the largest hypercube around a solution that does not encompass by any other solutions. Boundary points or solutions (e.g., 210a and 210n) are assigned a crowding distance of twice the distance to the nearest neighbor. Uniformity measurement is similar to the standard deviation of the crowding distance and hence a small value of the uniformity metric is desired, thereby achieving a good distribution of solutions.

Figure 2:
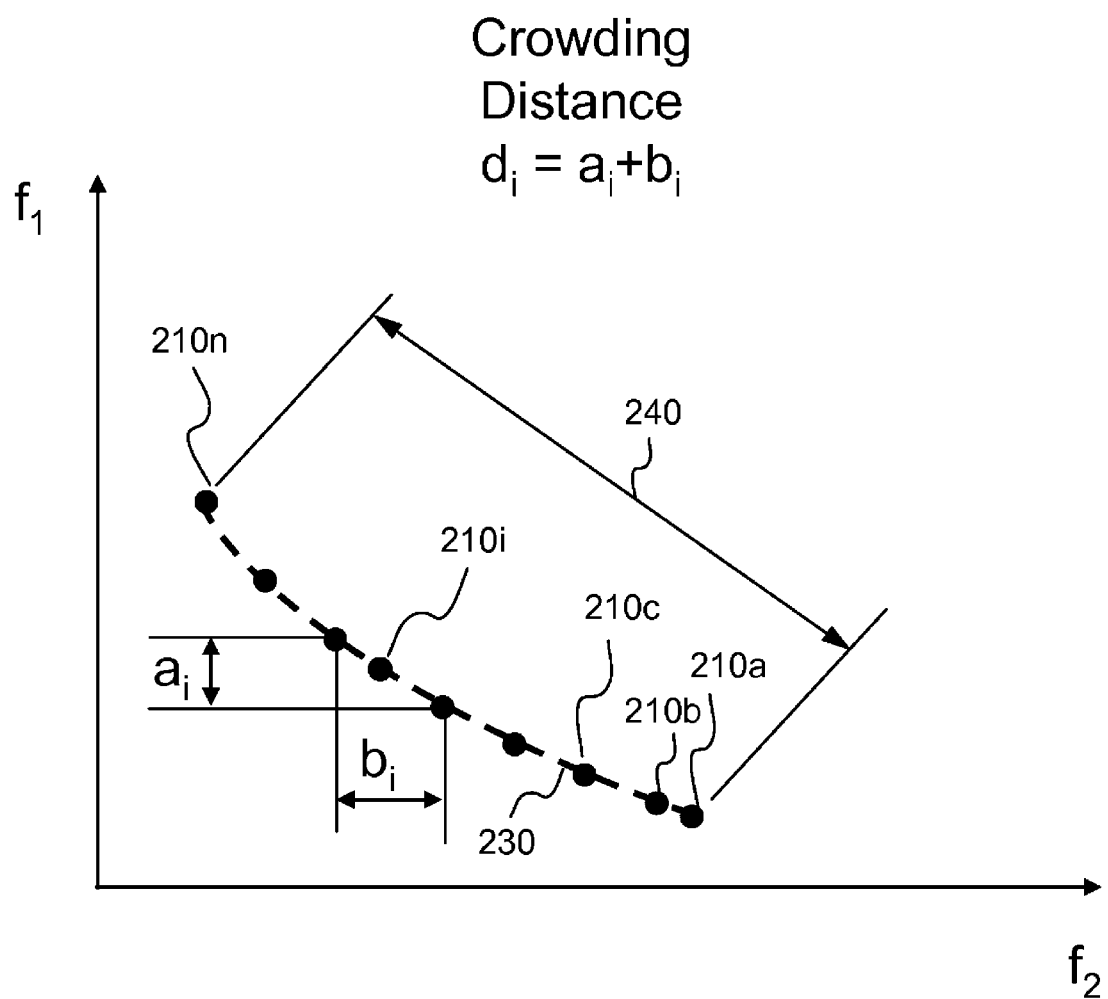
FIG. 2 is a diagram graphically showing definition of crowding distance of a solution in a Pareto front.

FIG. 2 shows an exemplary set of Pareto optimal solutions (shown as dots) 210a-n in a design objective function space represented by two functions (i.e., a two-dimensional function space with $f_1$ and $f_2$ as the two axes). Pareto optimal front is represented by dotted line 230. The distance 240 between two extreme end solutions 210a and 210n is referred to as spread of the set of Pareto optimal solutions. Crowding distance $d_i$ of solution 210i is equal to distance $a_i$ plus $b_i$.

For illustration and description simplicity, only two design objective functions are demonstrated in FIG. 2. Those of ordinary skill in the art would know that other numbers of objection functions are used in an optimization conducted for real world projects.

The goal in a MOEA based engineering design optimization is to obtain a complete global Pareto optimal solution set. However, the global Pareto optimal solution set is unknown for a real-world product, hence a set of solutions that encompasses "diversified" solutions is desired.

Figure 3A:
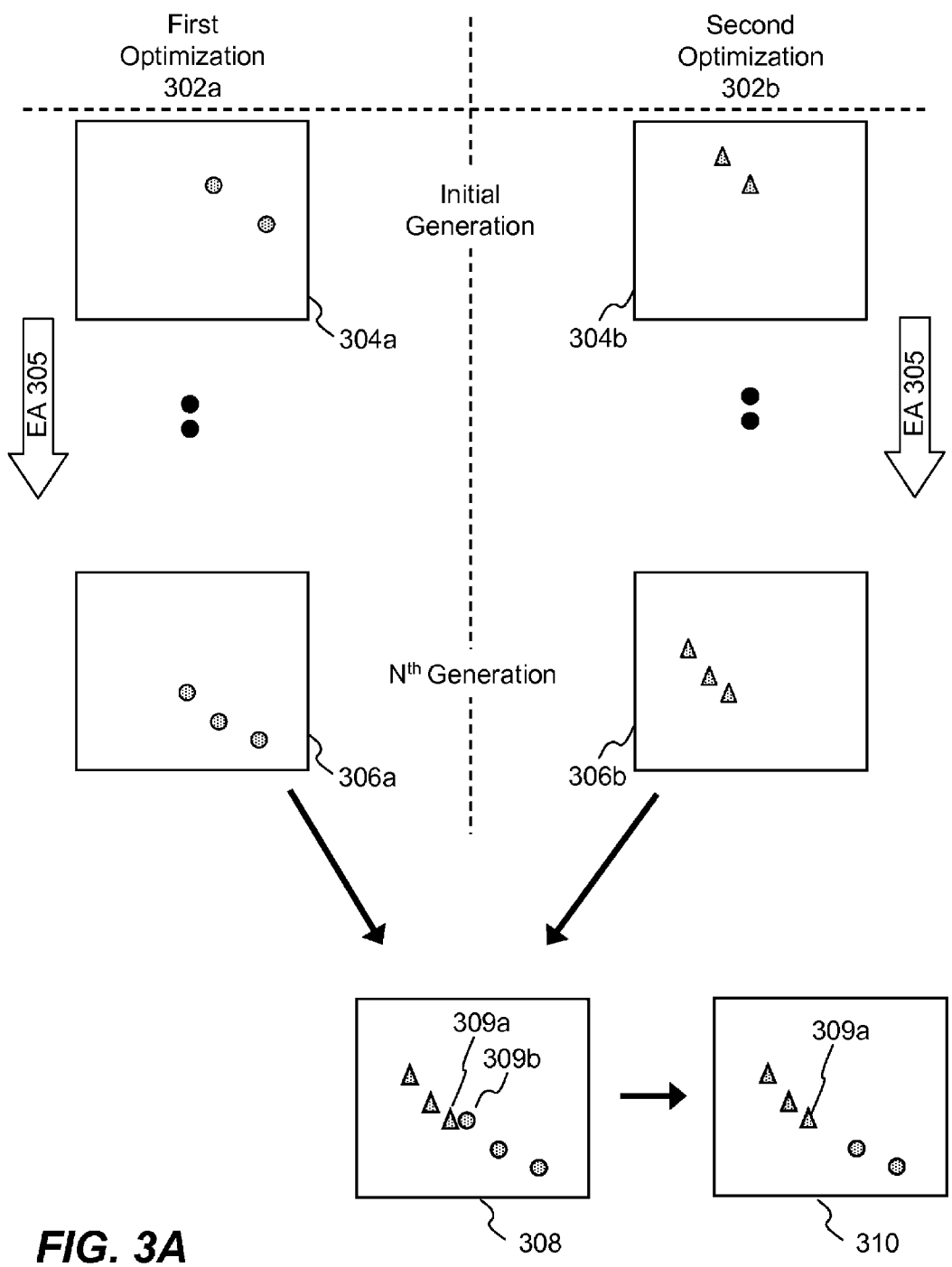
FIGS. 3A-3B are diagrams showing examples of combining solutions from two independently conducted MOEA based optimization, according to an embodiment of the present invention.
Figure 3B:
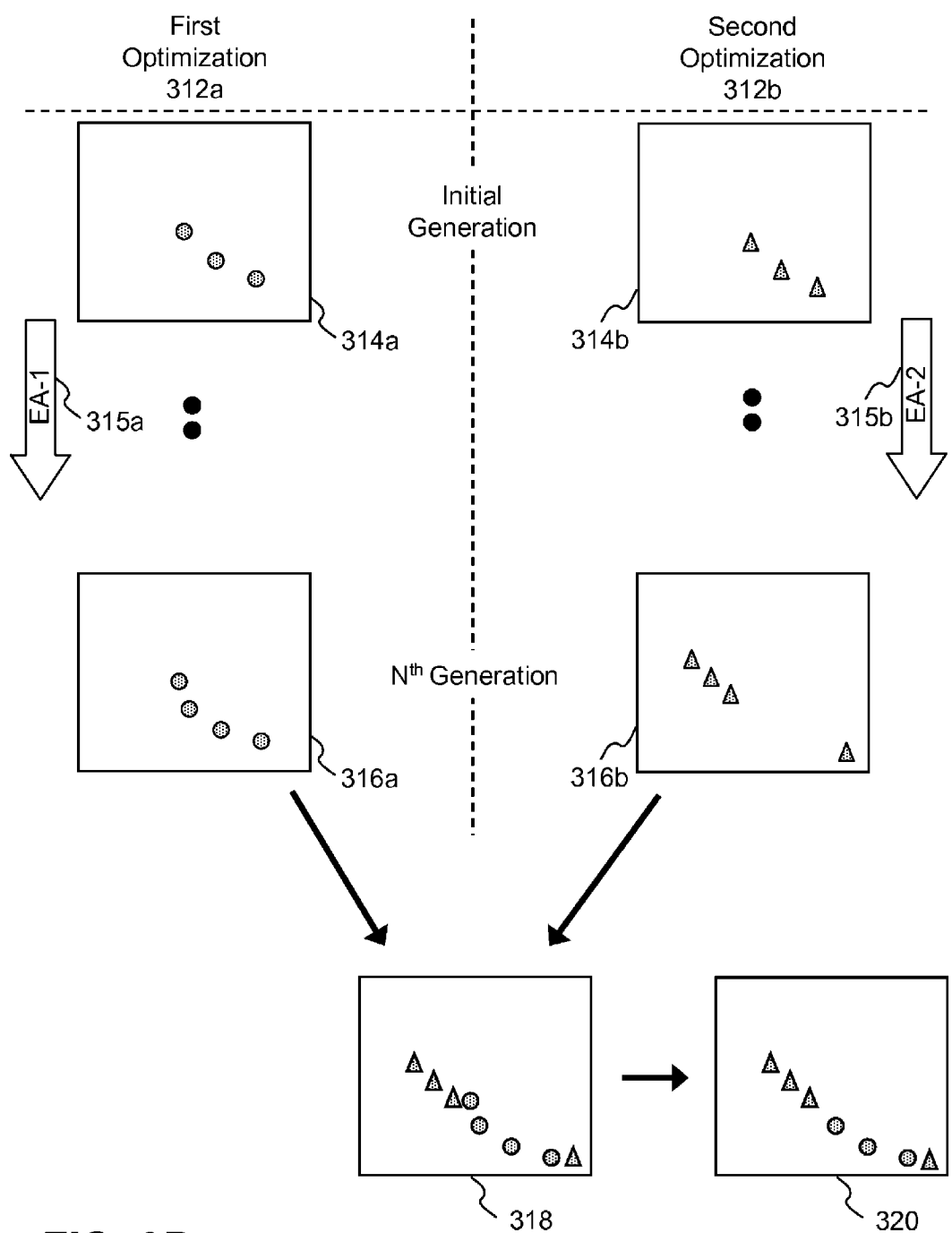

One of the means to achieve such goal is demonstrated in examples shown in FIGS. 3A-3B. In FIG. 3A, two MOEA based optimizations (i.e., first and second optimizations 302a-b) of a product are conducted independently. Each optimization starts with a randomly created initial generation of populations (i.e., design alternatives). The difference between these two optimizations is the populations in the initial generation are different. In one embodiment, different seeds of a random or pseudo-random number generator are used. As a result, different populations are created due to different series of random or pseudo-random numbers. Design alternatives (populations) are then evaluated and ranked in an objective function space. First and second sets 304a-b of Pareto optimal solutions of the initial generation shown in FIG. 3A are for the first and second optimizations 302a-b, respectively. The optimization is carried out in accordance with an evolutionary algorithm (e.g., NSGA-II) shown as an arrow "EA" 305 for N generations. Respective sets 306a-b of Pareto optimal solutions are resulted at the end of the $N^{th}$ generation. The sets 306a-b are then combined into a combined set of Pareto optimal solutions 308. It is visually evident that the combined set 308 has a wider spread than either of the sets 306a-b, hence being better converged and diversified. When combining the sets 306a-b, only non-dominated solutions are kept (see FIG. 1C for an exemplary process of determining dominate solution). For example, solution 309b is dominated by solution 309a, thereby solution 309b is not included in the final combined set 310.

Two optimizations 312a-b are also independently conducted in the example shown in FIG. 3B. In this example, the optimizations 312a-b start with a same set of design alternatives (i.e., populations) as the initial generation. After evaluating the design objection functions and ranking, first and second sets 314a-b of Pareto optimal solutions are identical. Independent optimizations are carried out with two different evolutionary algorithms indicated by arrow 'EA-1' 315a and arrow 'EA-2' 315b. For example, 'EA-1' is NSGA-II, while 'EA-2' is SPEA. After N generations of evolution, two sets 316a-b of Pareto optimal solutions are resulted and combined into a combined set 318. In this example, uniformity of the combined set 318 is much better than the second set 316b and spread of the combined set 318 is better than the first set 316a. Similar to the previous example, the final combined set 320 includes only non-dominated solutions in the set 318.

Figure 4:
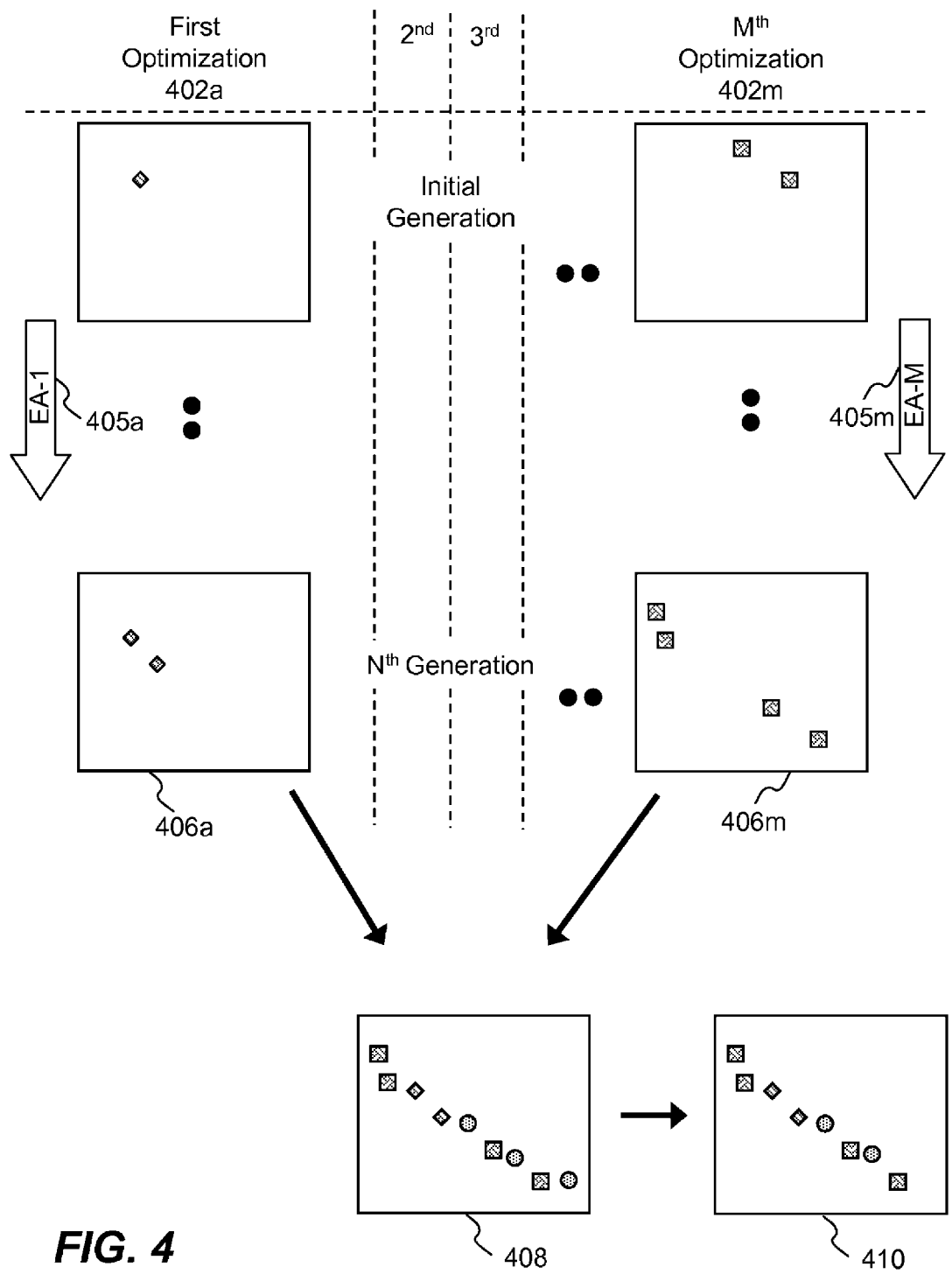
FIG. 4 is a diagram showing an example of combining a plurality of MOEA based optimization to form a better converged and diversified set of solutions.

Referring now to FIG. 4, it is shown a more general example of obtaining a better diversified set of Pareto optimal solutions in MOEA based engineering design optimization, according to an embodiment of the present invention. A number of MOEA based optimizations (first to $M^{th}$ 402a-m) are conducted independently with arbitrary initial generation of design alternatives. Evolutions are carried out with same or different evolutionary algorithms (i.e., 'EA-1' 405a . . . 'EA-M' 405m). M sets of Pareto solutions 406a-m are combined into a combined set 408 after N generations. It is noted that M and N are positive integers or whole numbers, the combined set 408 would contain better converged and diversified solutions comparing to each independent optimization alone. Finally, dominated solutions are taken out of set 408 to form the final combined set 420.

Figure 5:
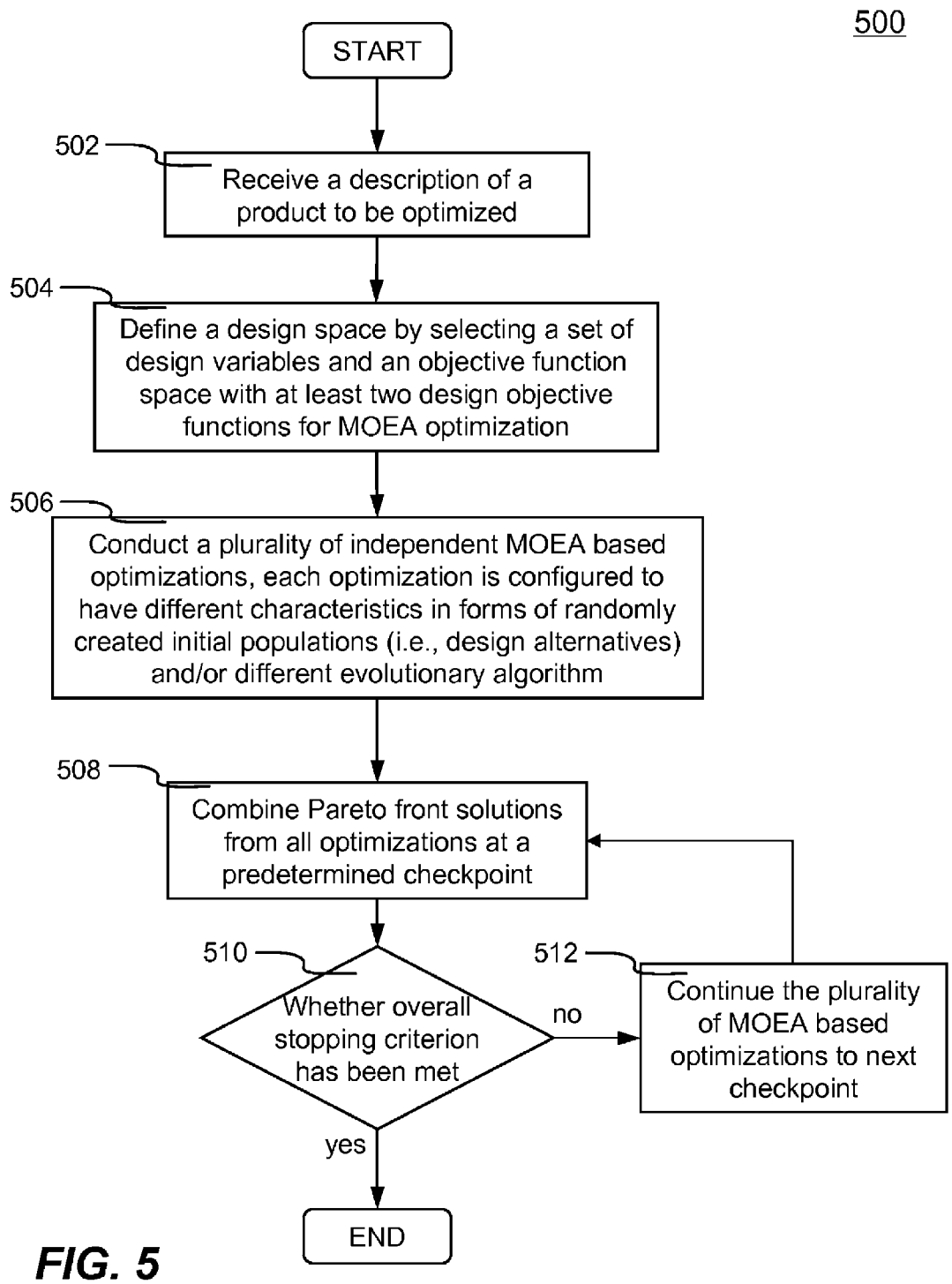
FIG. 5 is a flowchart illustrating an exemplary process of obtaining a set of better converged and diversified solutions by combining Pareto optimal solutions resulted from a plurality of independently conducted MOEA based engineering design optimizations, according to an embodiment of the present invention.

FIG. 5 is a flowchart illustrating an exemplary process 500 of obtaining such set of diversified solutions by combining Pareto optimal solutions resulted from a plurality of independently conducted MOEA based engineering design optimizations, according to an embodiment of the present invention. Process 500 is preferably implemented in software.

Process 500 starts by receiving a description of a product (e.g., consumer electronics, car, airplane, etc.) to be optimized at step 502. At step 504, a design space of the product is defined by selecting a set of design variables (see FIG. 1A for a very simple example). Also an objective function space is defined by identifying a plurality of design objective functions in a MOEA based optimization. Next, at step 506, a plurality of independent MOEA based engineering design optimizations is conducted (see example shown in FIG. 4). Each of the optimizations is configured to have certain different characteristics or parameters, for example, design alternatives in the initial generation and/or evolutionary algorithm (NSGA-II, SPEA, etc.). Then, Pareto optimal solutions obtained in each of the optimization are combined into a combined set of solutions at predetermined checkpoints (e.g., after the $N^{th}$ generation of the evolution) at step 508. Checkpoint can be defined by a number of criteria, for example, total number of objective function evaluations, number of generations, or other equivalent conditions suitable for determining whether the combined set of solutions has achieved a global Pareto optimal solution set. Process 500 moves to a decision 510, in which it is determined whether the overall stopping or termination criterion of the MOEA based optimization has been met. The overall stopping criterion can be implemented in many conditions. For example, it can be defined as when any one of the independently conducted optimizations has converged, or when all of the independent optimizations have converged. It can also examine all of the combined sets at all previous checkpoints to determine whether the Pareto optimal solutions have converged.

If 'no', process 500 moves to step 512 to continue carrying out the plurality of MOEA based optimizations to a next checkpoint. Then repeating step 508 and decision 510 until decision 510 becomes true. Process 500 ends by following the 'yes' branch.

Figure 6:
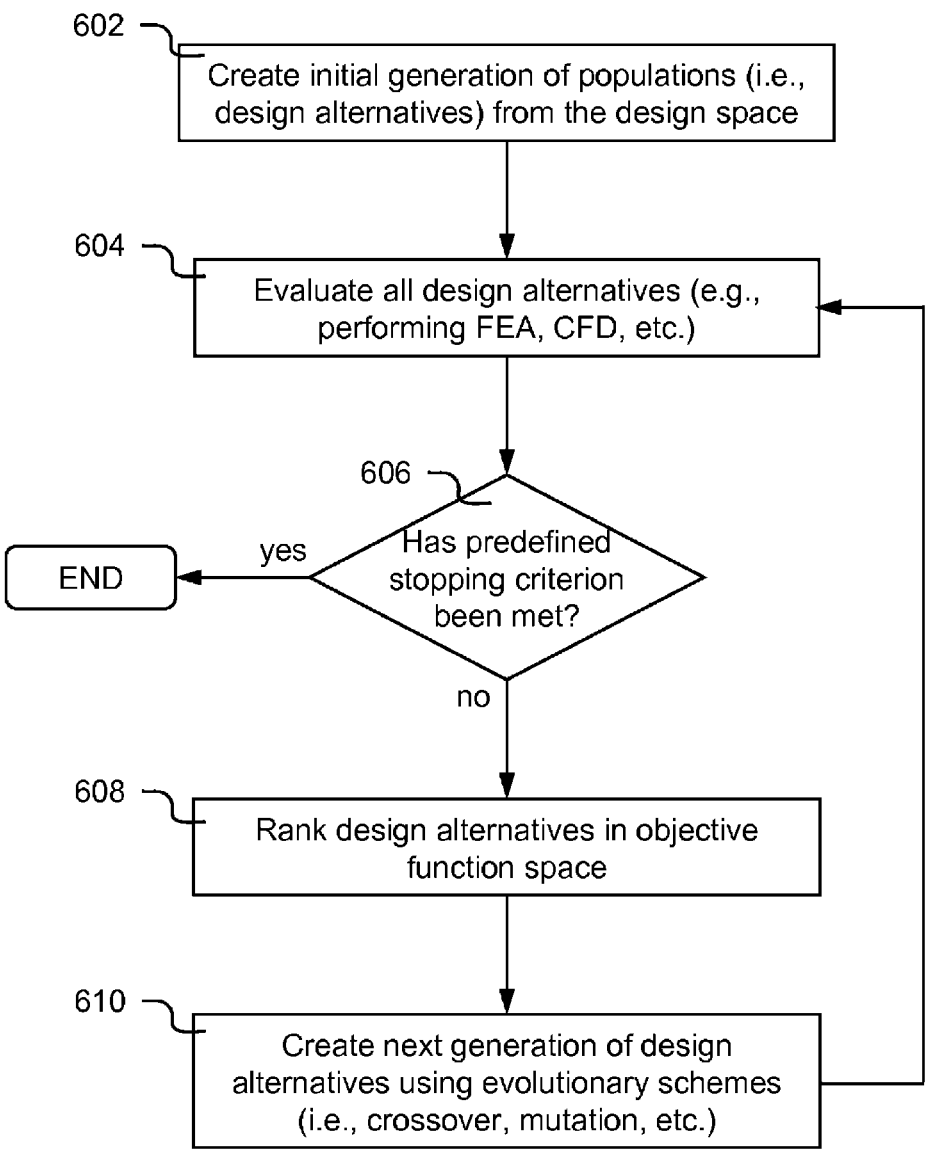
FIG. 6 is a flowchart illustrating an exemplary process of conducting engineering optimization using genetic or evolutionary algorithm.

A flowchart shown in FIG. 6 illustrates an exemplary process 600 of carrying out an evolutionary algorithm used in an engineering design optimization of a product. Process 600 is preferably implemented in software.

Process 600 starts by creating an initial generation of populations (e.g., design alternatives of the product) from the design space at step 602. The design space is a n-dimensional hyperspace defined by "n" design variables. The initial generation of populations are generally created randomly, which can be simulated in a computer system (e.g., computer 700 of FIG. 7) using a random or pseudo-random number generator. Next, each design alternative is evaluated at step 604. The evaluation is generally performed with a computer aided engineering analysis (e.g., finite element analysis, meshfree analysis, boundary element analysis, computational fluid dynamics, etc.). Solutions of the computer-aided analysis are put in an objective function space. Next, at decision 606, it is determined whether a predefined stopping criterion has been met. If 'no', process 600 moves to step 608 to rank the solutions (e.g., nondominated solutions shown in FIG. 1B). Other equivalent methods can also be used.

At step 610, a next generation of populations or design alternatives is created from the previous generation using evolutionary schemes such as crossover, mutation, etc. Then process 600 moves back to step 604 to repeat until decision 606 becomes true. Process 600 ends.

Figure 7:
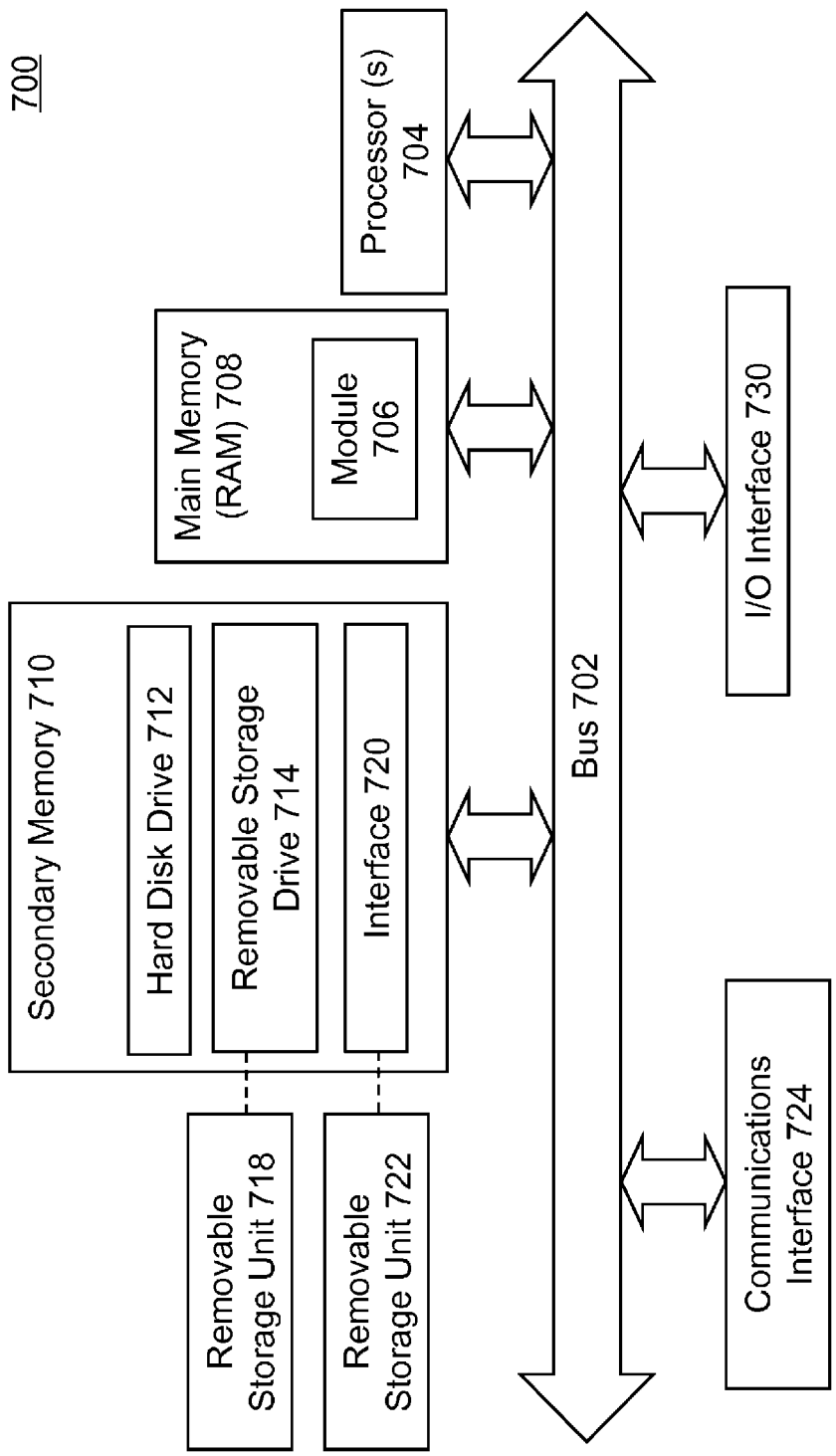
FIG. 7 is a function diagram showing salient components of a computing device, in which an embodiment of the present invention may be implemented.

According to one aspect, the present invention is directed towards one or more computer systems capable of carrying out the functionality described herein. An example of a computer system 700 is shown in FIG. 7. The computer system 700 includes one or more processors, such as processor 704. The processor 704 is connected to a computer system internal communication bus 702. Various software embodiments are described in terms of this exemplary computer system. After reading this description, it will become apparent to a person skilled in the relevant art(s) how to implement the invention using other computer systems and/or computer architectures.

Computer system 700 also includes a main memory 708, preferably random access memory (RAM), and may also include a secondary memory 710. The secondary memory 710 may include, for example, one or more hard disk drives 712 and/or one or more removable storage drives 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 722 and interfaces 720 which allow software and data to be transferred from the removable storage unit 722 to computer system 700. In general, Computer system 700 is controlled and coordinated by operating system (OS) software, which performs tasks such as process scheduling, memory management, networking and I/O services.

There may also be a communications interface 724 connecting to the bus 702. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724. The computer 700 communicates with other computing devices over a data network based on a special set of rules (i.e., a protocol). One of the common protocols is TCP/IP (Transmission Control Protocol/Internet Protocol) commonly used in the Internet. In general, the communication interface 724 manages the assembling of a data file into smaller packets that are transmitted over the data network or reassembles received packets into the original data file. In addition, the communication interface 724 handles the address part of each packet so that it gets to the right destination or intercepts packets destined for the computer 700. In this document, the terms "computer program medium", "computer readable medium", "computer recordable medium" and "computer usable medium" are used to generally refer to media such as removable storage drive 714 (e.g., flash storage drive), and/or a hard disk installed in hard disk drive 712. These computer program products are means for providing software to computer system 700. The invention is directed to such computer program products.

The computer system 700 may also include an input/output (I/O) interface 730, which provides the computer system 700 to access monitor, keyboard, mouse, printer, scanner, plotter, and alike.

Computer programs (also called computer control logic) are stored as application modules 706 in main memory 708 and/or secondary memory 710. Computer programs may also be received via communications interface 724. Such computer programs, when executed, enable the computer system 700 to perform the features of the present invention as discussed herein. In particular, the computer programs, when executed, enable the processor 704 to perform features of the present invention. Accordingly, such computer programs represent controllers of the computer system 700.

In an embodiment where the invention is implemented using software, the software may be stored in a computer program product and loaded into computer system 700 using removable storage drive 714, hard drive 712, or communications interface 724. The application module 706, when executed by the processor 704, causes the processor 704 to perform the functions of the invention as described herein.

The main memory 708 may be loaded with one or more application modules 706 that can be executed by one or more processors 704 with or without a user input through the I/O interface 730 to achieve desired tasks. In operation, when at least one processor 704 executes one of the application modules 706, the results are computed and stored in the secondary memory 710 (i.e., hard disk drive 712). The status of the CAE analysis or engineering design optimization (e.g., Pareto optimal solutions before and after combination) is reported to the user via the I/O interface 730 either in a text or in a graphical representation.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas numbers of design objective functions have been shown as two, in reality, larger numbers of design objectives are used. Furthermore, whereas the size of populations or design alternatives at each generation is shown and described as small numbers, other sizes or numbers can be used instead. In summary, the scope of the invention should not be restricted to the specific exemplary embodiments disclosed herein, and all modifications that are readily suggested to those of ordinary skill in the art should be included within the spirit and purview of this application and scope of the appended claims.

I claim:

1. A computer-implemented method of obtaining a set of diversified Pareto optimal solutions a multi-objective evolutionary algorithm (MOEA) based engineering design optimization of a product, said method comprising:
   receiving, in a computer system, a description of a product to be optimized;
   conducting a plurality of MOEA based engineering design optimizations of the product independently, the engineering design optimizations being configured to use a set of common design variables and a set of common design objective functions, wherein each of the engineering design optimizations differs from others in initial generation's design alternatives and evolution schemes consisted of Nondominated Sorting Genetic Algorithm (NSGA-II) and strength Pareto evolutionary algorithm (SPEA);
   obtaining a combined set of Pareto optimal solutions at one or more predefined checkpoints by combining Pareto optimal solutions resulted from said each of the engineering optimizations; and
   designating the combined set of Pareto optimal solutions as global Pareto optimal solutions when any or all of engineering design optimizations have converged based on spread and uniformity measurements, wherein the global Pareto optimal solutions are stored in a storage device and graphically displayed in a monitor upon user's instruction.

2. The computer-implemented method of claim 1, further comprises randomly creating the initial generation's design alternatives for said each of the engineering design optimization.

3. The computer-implemented method of claim 1, wherein the predefined one or more checkpoints are measured by numbers of generation.

4. The computer-implemented method of claim 1, wherein the predefined one or more checkpoints are measured by numbers of objective function evaluation.

5. The computer-implemented method of claim 1, wherein each of the combined set of Pareto optimal solutions is non-dominated to others.

6. A computer readable medium containing instructions for controlling a computer system for obtaining a set of diversified Pareto optimal solutions a multi-objective evolutionary algorithm (MOEA) based engineering design optimization of a product by a method comprising:
   receiving, in a computer system, a description of a product to be optimized;
   conducting a plurality of MOEA based engineering design optimizations of the product independently, the engineering design optimizations being configured to use a set of common design variables and a set of common design objective functions, wherein each of the engineering design optimizations differs from others in initial generation's design alternatives and evolution schemes consisted of Nondominated Sorting Genetic Algorithm (NSGA-II) and strength Pareto evolutionary algorithm (SPEA);
   obtaining a combined set of Pareto optimal solutions at one or more predefined checkpoints by combining Pareto optimal solutions resulted from said each of the engineering optimizations; and
   designating the combined set of Pareto optimal solutions as global Pareto optimal solutions when any or all of the engineering design optimizations has converged based on spread and uniformity measurements, wherein the global Pareto optimal solutions are stored in a storage device and graphically displayed in a monitor upon user's instruction.

7. The computer readable medium of claim 6, further comprises randomly creating the initial generation's design alternatives for said each of the engineering design optimization.

8. A system for obtaining a set of diversified Pareto optimal solutions a multi-objective evolutionary algorithm (MOEA) based engineering design optimization of a product, said system comprising:
   a main memory for storing computer readable code for at least one application module;
   at least one processor coupled to the main memory, said at least one processor executing the computer readable code in the main memory to cause the at least one application module to perform operations by a method of:
   receiving a description of a product to be optimized;
   conducting a plurality of MOEA based engineering design optimizations of the product independently, the engineering design optimizations being configured to use a set of common design variables and a set of common design objective functions, wherein each of the engineering design optimizations differs from others in initial generation's design alternatives and evolution schemes consisted of Nondominated Sorting Genetic Algorithm (NSGA-II) and strength Pareto evolutionary algorithm (SPEA);
   obtaining a combined set of Pareto optimal solutions at one or more predefined checkpoints by combining Pareto optimal solutions resulted from said each of the engineering optimizations; and
   designating the combined set of Pareto optimal solutions as global Pareto optimal solutions when any or all of the engineering design optimizations has converged based on spread and uniformity measurements, wherein the global Pareto optimal solutions are stored in a storage device and graphically displayed in a monitor upon user's instruction.

9. The system of claim 8, further comprises randomly creating the initial generation's design alternatives for said each of the engineering design optimization.

* * * * *